United States Patent [19]
Sprafka et al.

[11] Patent Number: 6,123,340
[45] Date of Patent: Sep. 26, 2000

[54] MODULAR FLOW DEVICES

[75] Inventors: Brian K. Sprafka, Euclid; Daniel E. Zeiler, Willoughby; Maria T. Longo, South Euclid, all of Ohio

[73] Assignee: Swagelok Company, Solon, Ohio

[21] Appl. No.: 09/227,621

[22] Filed: Jan. 8, 1999

Related U.S. Application Data

[63] Continuation-in-part of application No. 09/088,210, May 29, 1998, and a continuation of application No. 09/113,201, Jul. 10, 1998.
[60] Provisional application No. 60/070,981, Jan. 9, 1998.

[51] Int. Cl.[7] .................................................. F16L 17/06
[52] U.S. Cl. ........................ 277/608; 277/617; 137/515.7
[58] Field of Search .................................. 277/608, 609, 277/617, 626, 339, 340; 137/515.5, 515.7; 200/84 C

[56] References Cited

U.S. PATENT DOCUMENTS

| | | |
|---|---|---|
| 2,963,563 | 12/1960 | Patterson . |
| 3,429,581 | 2/1969 | Himmel . |
| 3,717,169 | 2/1973 | Schoger . |
| 4,020,481 | 4/1977 | Nakagawa ........................ 200/84 C X |
| 4,181,835 | 1/1980 | Stadler et al. . |
| 4,313,111 | 1/1982 | Anderson . |
| 4,444,214 | 4/1984 | Paul, Jr. ............................. 137/515.7 X |
| 4,763,114 | 8/1988 | Eidsmore . |
| 4,856,555 | 8/1989 | Gausman et al. . |
| 4,911,411 | 3/1990 | Jones et al. . |
| 5,199,239 | 4/1993 | Younger . |
| 5,224,379 | 7/1993 | Koebernik et al. .................... 200/84 C |
| 5,505,464 | 4/1996 | McGarvey ........................... 277/626 X |
| 5,605,179 | 2/1997 | Strong, Jr. et al. . |
| 5,887,876 | 3/1999 | Aldridge et al. ........................ 277/609 |

FOREIGN PATENT DOCUMENTS

| | | |
|---|---|---|
| 1291105 | 10/1991 | Canada . |
| 0 806 573 | 11/1997 | European Pat. Off. . |
| 952 482 | 11/1956 | Germany . |

OTHER PUBLICATIONS

Swagelok Vertical Flow Sensor, Nupro Company, Willoughby, Ohio 44094, Jul., 1997.
New End Connections for CW Series All–Welded Check Valve, Swagelok Nupro Company, Willoughby, Ohio 44094, May, 1997.

*Primary Examiner*—Peter M. Cuomo
*Assistant Examiner*—Karlena Schwing
*Attorney, Agent, or Firm*—Calfee Halter & Griswold LLP

[57] ABSTRACT

The present invention provides a seal for use in a modular flow device and is utilized for joining and aligning a first mating surface and second mating surface having axial flow passageways. The seal comprises a protruding annular radiused edge about the axial passageway of the first mating surface and an annular groove about the axial passageway of the second mating surface. The groove has an inner angled wall for engaging with the annular radiused edge when the mating surfaces are compressively joined. Thus, a leak proof seal is formed around the fluid passageway and the passageways are aligned with respect to each other. The invention also relates to check valves for use with modular surface mount systems in which the check valve can be used as a surface mounted component or as part of a substrate that is mounted to or between other substrates and components.

19 Claims, 11 Drawing Sheets

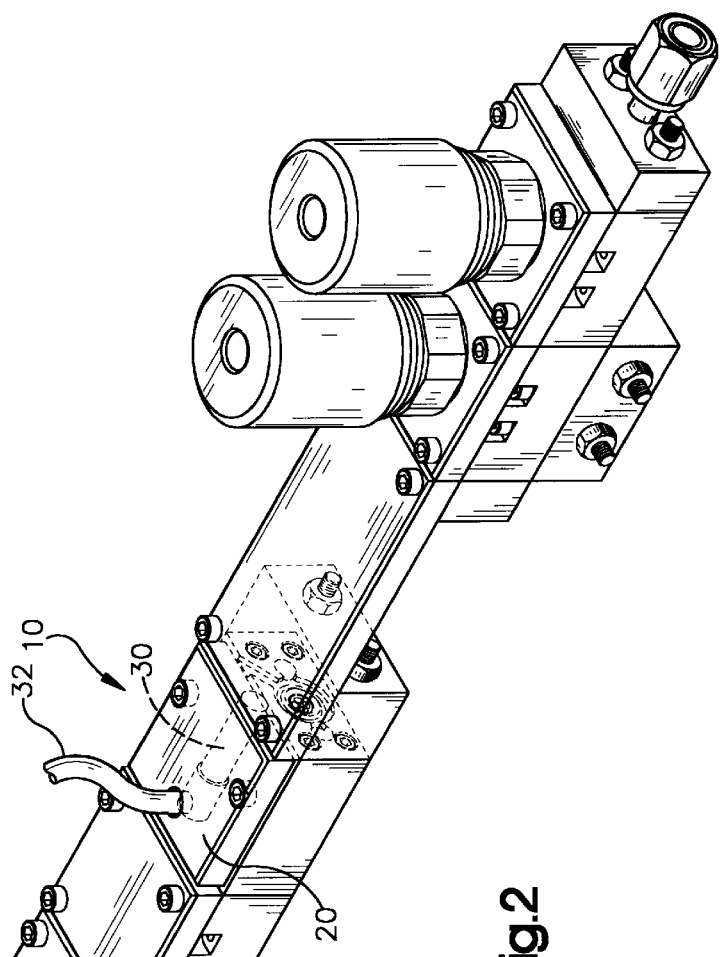
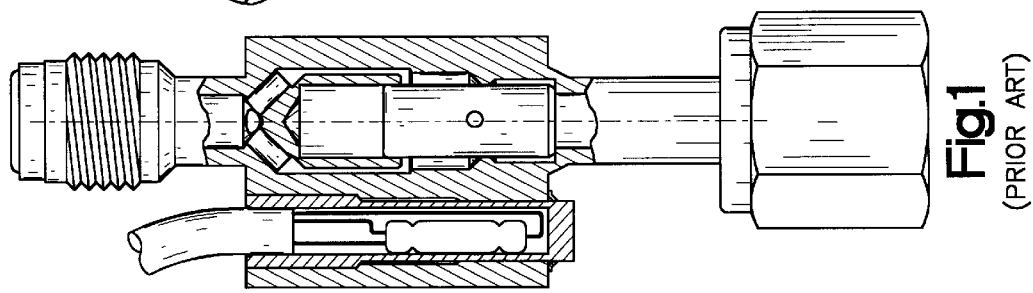
Fig.2
Fig.1 (PRIOR ART)

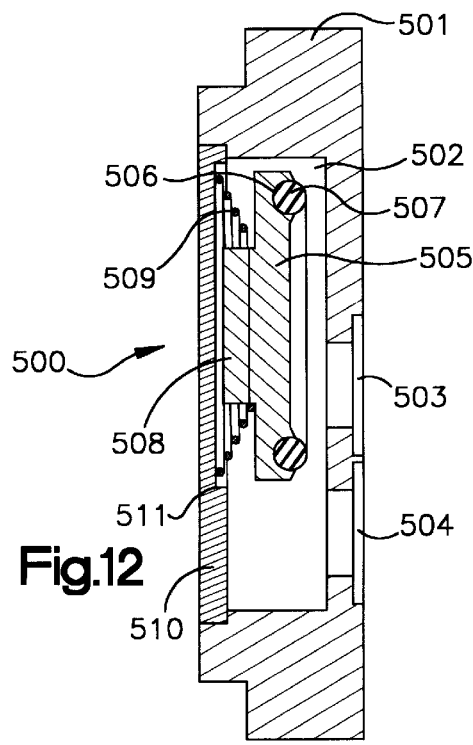
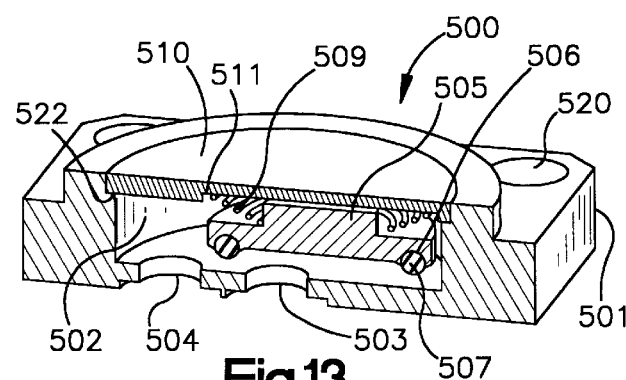
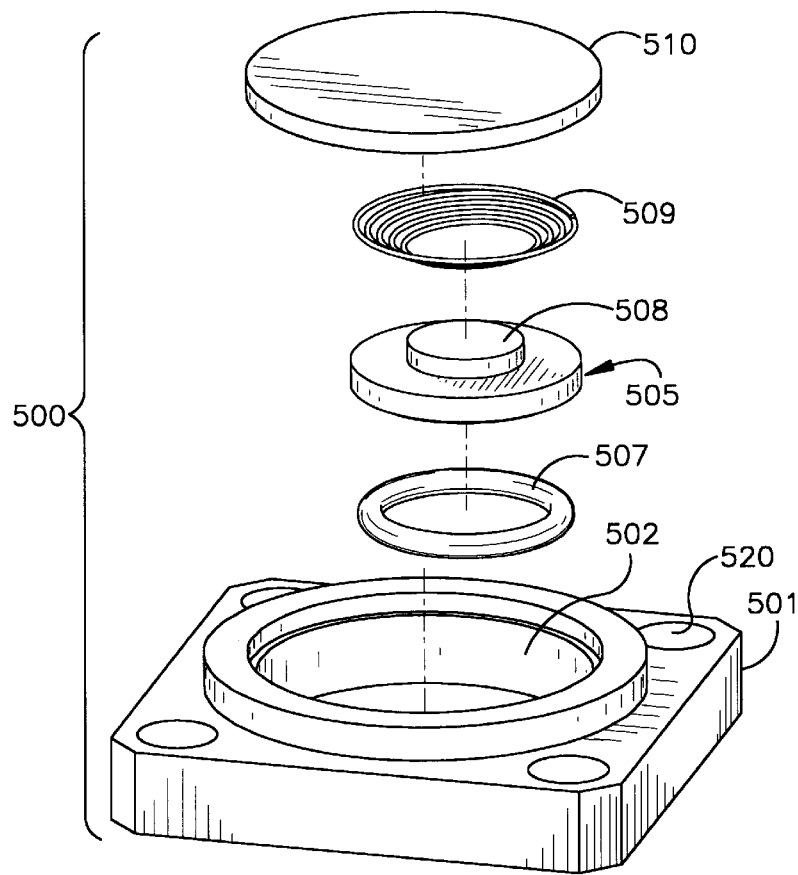

MODULAR FLOW DEVICES

RELATED APPLICATIONS

This application is a continuation-in-part of U.S. patent application Ser. No. 09/088,210, filed May 29, 1998 for MODULAR FLOW DEVICE and Ser. No. 09/113,201 filed Jul. 10, 1998 for MODULAR FLOW DEVICE, both disclosures of which are fully incorporated herein by reference.

This application claims the benefit of provisional patent application Ser. No. 60/070,981 filed on Jan. 9, 1998 for CHECK VALVE FOR MODULAR SURFACE MOUNT APPLICATIONS, the entire disclosure of which is fully incorporated herein by reference.

FIELD OF THE INVENTION

The present invention pertains generally to modular surface mount (MSM) technology such as used for gas sticks in the semiconductor industry for example. More particularly, the invention relates to check valves for MSM applications.

BACKGROUND OF THE INVENTION

To manufacture semiconductors the industry uses various high purity gases. These gases are controlled by systems made up of high purity valves, regulators, pressure transducers, mass flow controllers and other components connected together by high purity metal seal fittings. These fittings may be undesirable because they add space between components and make it difficult to replace a component located between components. New modular surface mount manifold systems which overcome these problems have been recently introduced by several companies and are becoming very popular. Component manufacturers have reconfigured their components so the inlet and outlet ports and attachment mechanism are compatible with these manifolds. However, a simple economical check valve for these applications is needed.

Gas flow indicators of the general type under consideration are known in the art (See FIG. 1) and are shown and described for example in U.S. Pat. Nos. 2,963,563, 4,181,835, 4,313,111, and 4,763,114, the latter of which is hereby incorporated by reference. These prior art flow sensors generally comprise a device for use as a flow indicator to produce an electrical signal when flow through the device has reached a set range of flow rates. A cylindrical magnet is slidably mounted in a gas cylindrical passage for actuating a magnetic responsive switch. When the gas flow through the device reaches a predetermined range of flow rates, the pressure build-up causes the float to move against a gravity or spring bias. The movement of the magnet with the float actuates a reed switch or the like to produce an output signal indicating a predetermined flowrate has been reached.

These devices are generally contained in a housing which is not suitable for use in integrated gas systems used in semiconductor manufacturing which incorporate modular surface mount (MSM) technology. For an example of a system utilizing MSM technology see FIG. 2 and U.S. Pat. No. 5,605,179 to Strong. These integrated gas systems generally require a size reduction in the range of 50% to 60% in the axial direction, which makes it difficult to incorporate conventional fittings and the sensor in the significantly reduced space.

In addition, the semiconductor industry is increasingly demanding sensors and devices which are ultra-clean i.e., after manufacturing being capable of being cleaned to the highest standard of cleanliness in the industry. These prior art devices are generally welded together in several places which makes it extremely difficult and costly to clean and electro-polish the interior wetted surfaces after welding. Further, these devices require greater control to prevent misalignment during assembly between the float, the float guide and the body in order to provide consistent performance of the sensor.

Therefore, a new weld-free modular design of a flow sensor having improved alignment of the internal components and capable of being cleaned and electro-polished for use in a ultrapure semiconductor environment is desired. Further, a flow sensor is desired which is adapted to be received in a MSM system. It is further desired to provide a flow sensor which provides access to the reed switch without requiring the removal of the sensor from the system.

Still further it is desired to provide a check valve that is suitable for MSM applications.

SUMMARY OF THE INVENTION

The present invention provides in one aspect a seal for joining and aligning a first mating surface and second mating surface of a modular flow device having an axial flow passageway. The seal comprises a protruding annular radiused edge about the axial passageway of the first mating surface and an annular groove about the axial passageway of the second mating surface. The groove has an inner angled wall for engaging with the annular radiused edge when the mating surfaces are compressively joined. Thus, a leak proof seal is formed around the fluid passageway and the passageways are aligned with respect to each other.

The present invention provides in another aspect a modular flow device comprising a first component and a second component with each said component having an axial flow passageway therein. The first component has an inner sealing surface with a protruding annular surface about the axial flow passageway and a inner radiused surface. The second component has an inner sealing surface with an annular groove about its axial passageway. The groove has an angled wall which dimensionally interferes with the inner radiused surface of the annular surface when the first component and the second component are compressively engaged. Thus a leak proof seal is formed around the mating fluid passageways and the passageways are axially aligned with respect to each other.

These and other aspects of the invention are herein described in particularized detail with reference to the accompanying Figures.

BRIEF DESCRIPTION OF THE DRAWINGS

FIG. 1 shows a side view of a flow sensor of the prior art;

FIG. 2 shows a perspective view of a modular integrated gas system incorporating the flow sensor of the present invention;

FIGS. 12–14 illustrate another embodiment of a check valve for MSM applications.

DETAILED DESCRIPTION OF PREFERRED AND ALTERNATIVE EMBODIMENTS

Figure 3:
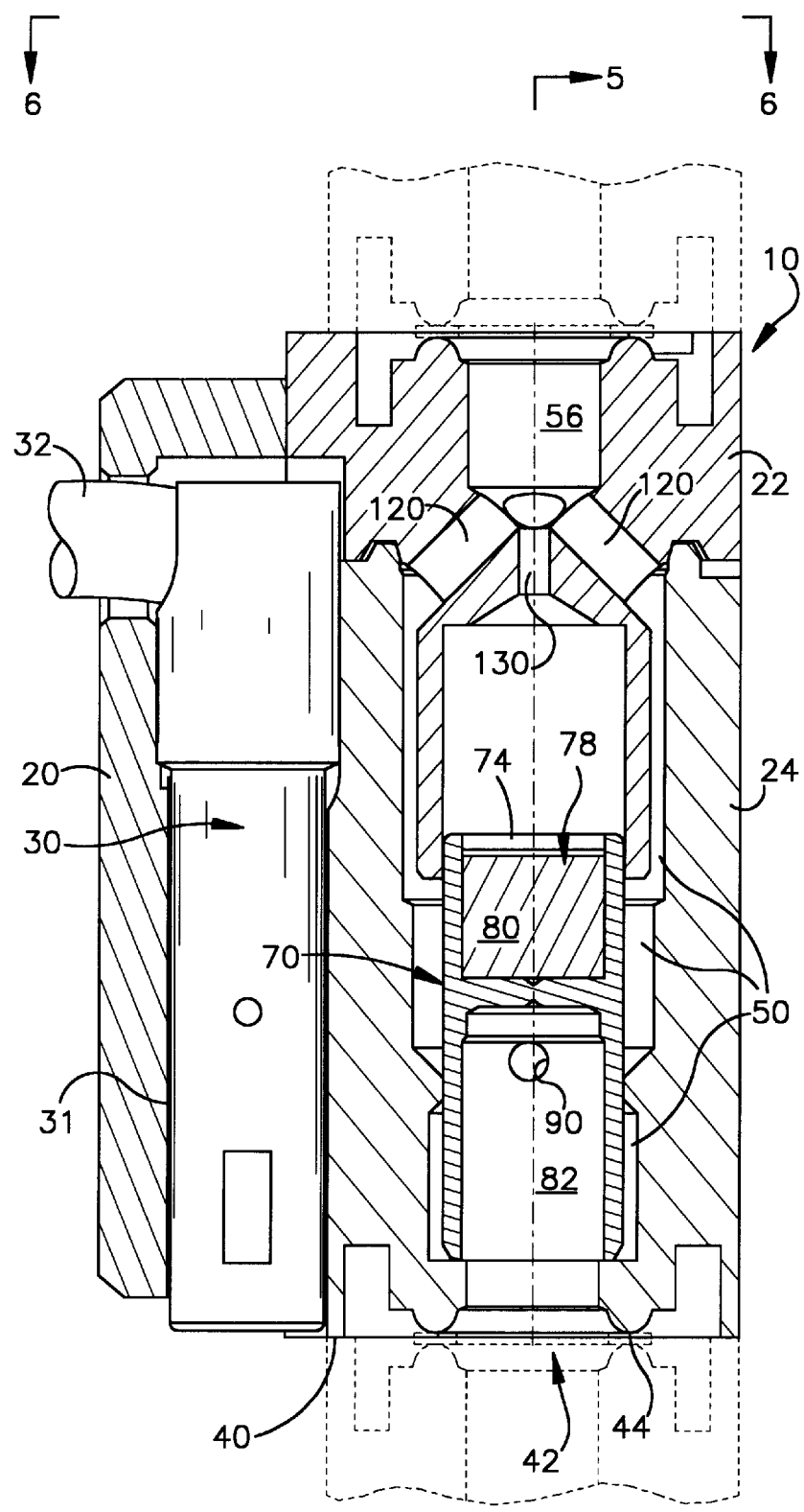
FIG. 3 shows a side view of the flow sensor of the invention.
Figure 4:
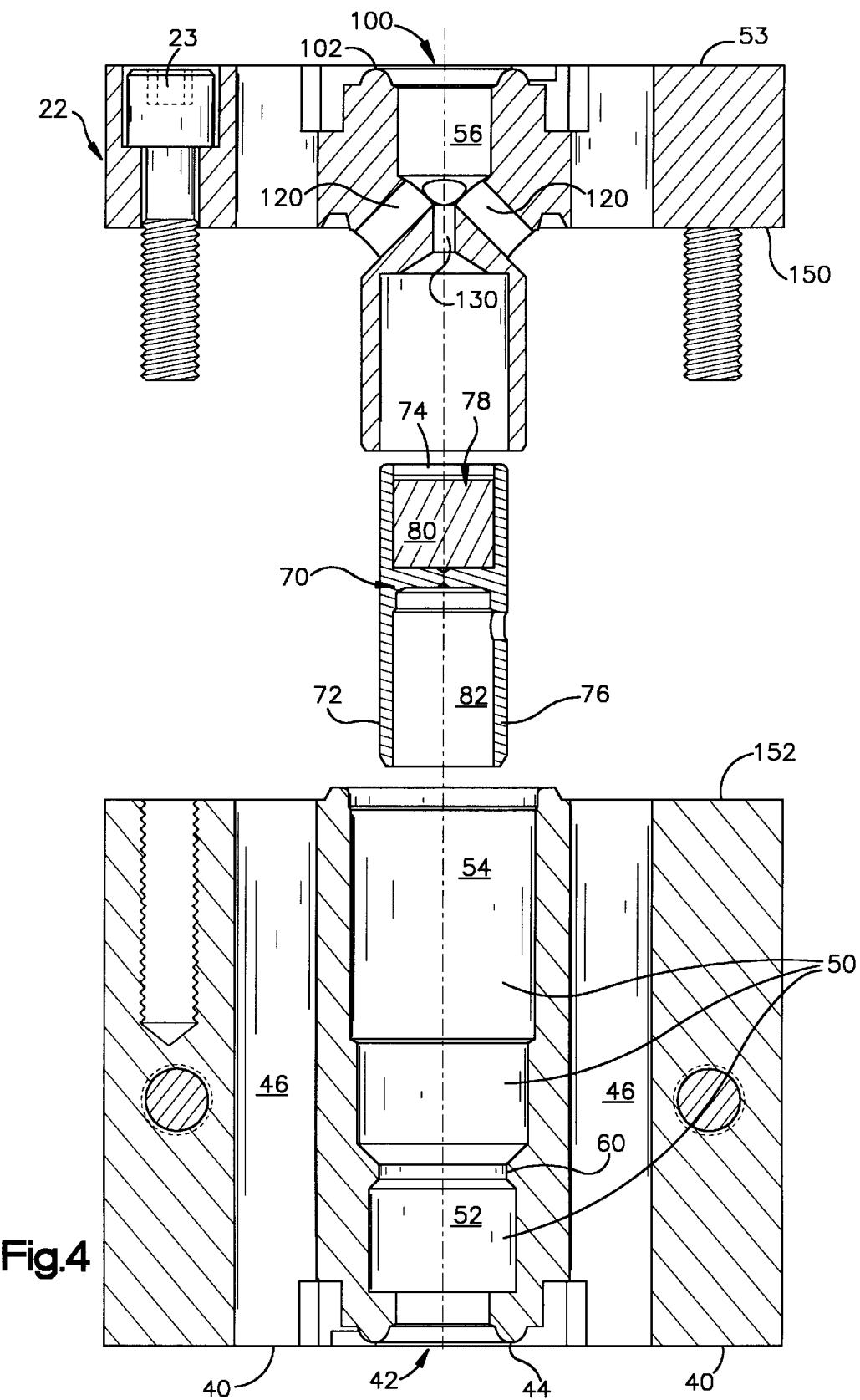
FIG. 4 shows an exploded view of the flow sensor of the invention prior to assembly.
Figure 5:
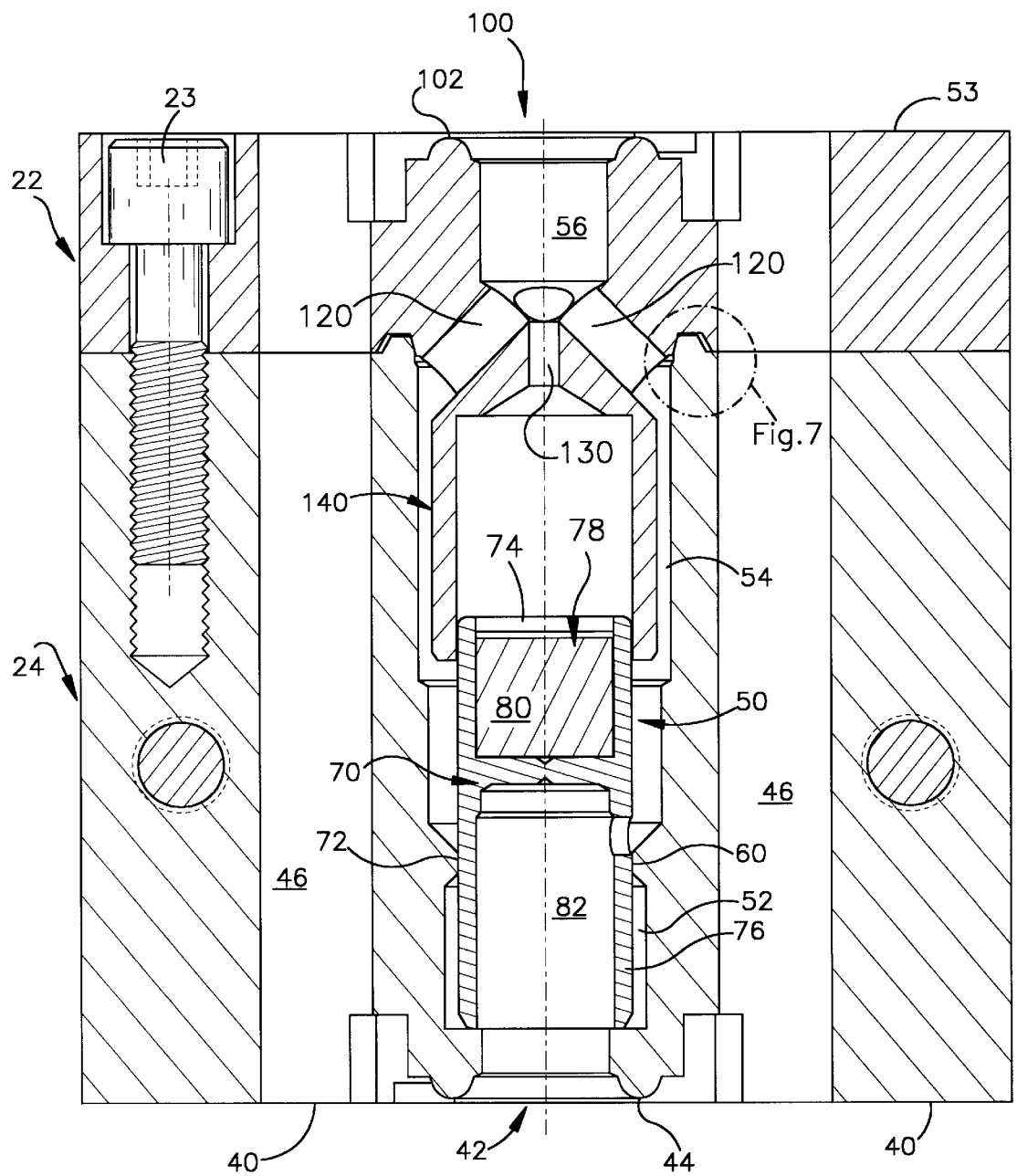
FIG. 5 shows a cross-sectional view of the flow sensor of the invention in an assembled configuration.
Figure 6:
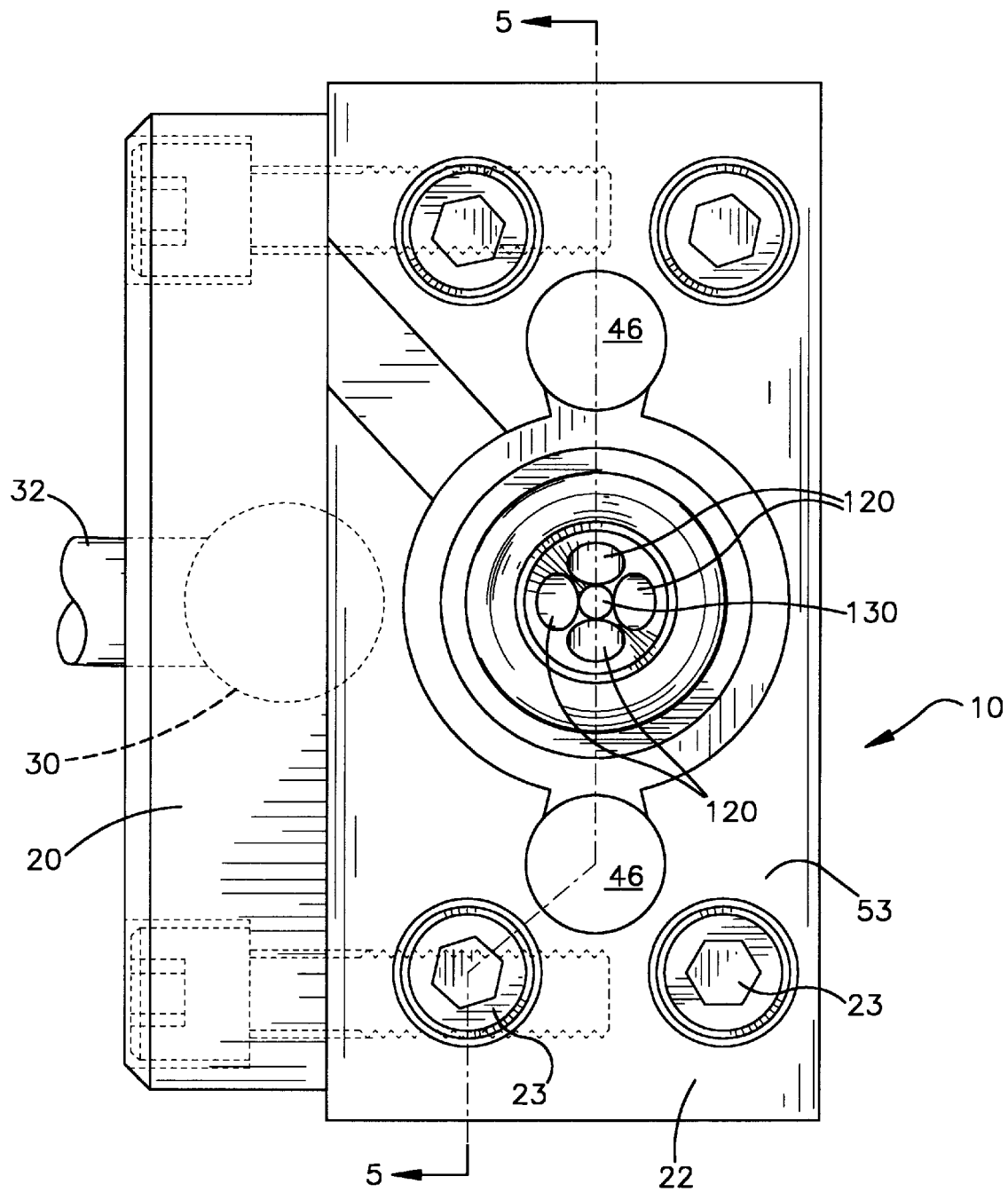
FIG. 6 shows a top view of the flow sensor of the invention.

Referring now to the figures wherein the drawings are for the purpose of illustrating a preferred embodiment of the invention only and not for the purpose of limiting same, FIGS. 3–8 illustrate a modular flow sensor assembly 10. The flow sensor is contained in a modular housing which may be formed of any suitable material such as stainless steel or any non-magnetic material. The modular housing 10 is preferably in the shape of a very compact block which thus has a minimized panel footprint for use in an inline gas stick such as that shown in FIG. 2. The modular housing further comprises a first component 20, a second component 22, and a third component 24 which are joined together as described in more detail below to define the flow sensor assembly 10. Housed within a recess or bore 31 located between the three components 20,22,24 is a reed switch 30 and signal cable 32. The magnetically operable reed switch 30 is mounted in the bore 31 which extends longitudinally and generally parallel to the flow passageway 50. The first component 20 or cover plate serves as an easily openable access panel for servicing the reed switch 30 without requiring removal of the entire flow device 10 from the system. It is important to note that other types of actuation indicating means could be utilized such as a proximity sensors or other types of actuation indicating means.

The third component 24 of the modular housing assembly 10 comprises an outer planar face 40 having a fluid inlet 42 which may further connect to a metal to metal type fitting. It is preferred that the inlet 42 comprise a VCR® type seal 44 manufactured by Swagelok® Company of Ohio, or a bead and metal gasket type seal, or any other metal-to-metal seal such as an energized or non-energized metal C ring. It is important to note that any available metal to metal seal may be readily used with the invention. The third component 24 may also optionally comprise one or more axial cavities 46 (See FIG. 6) for receiving a threaded rod or bolt (not shown) for providing structural support and make-up force for the seals 44,102 when the assembly 10 is installed in a MSM gas stick assembly such as the system shown in FIG. 2. Connected to the inlet 42 is an axial flow passageway 50 which is generally cylindrical in shape and which extends from the lower end face 40 to an upper planar surface 152 of component 24. The axial flow passageway 50 comprises a first passage section 52 which connects with the inlet 42. A second generally cylindrical section 54 is axially aligned with section 52 and which connects to the outlet passageway 56 of component 22 via axial passageways 120. An optional fluid metering ring 60 may be positioned between the first section 52 and the second section 54 for providing snap action of the float 70.

Carried within the passageway 50 is a float 70 which is designed to move up or down in a float guide 140 as the flow increases or decreases. The float 70 has a cylindrical shape with an outer wall 72 having a diameter less than the flow passageway 50. If the optional metering ring 60 is utilized, the outer diameter of the float 70 must be only slightly smaller than the metering ring 60 inner diameter. The interior of the float 70 is further defined by a first end 74 and a second end 76. The first end 74 comprises an enclosed chamber 78 located on the vertically upper end of the float 70 and which houses a magnet 80. The second lower end 76 of the float 70 is open and defines an inwardly extending cup-shaped section 82 for receiving fluid from the inlet. This cup shaped section 82 of the float 70 preferably contains one or more fluid metering orifices 90 as shown in FIG. 3. although these metering orifice(s) 90 may be placed elsewhere in the fluid passageway 50 of the system to accomplish the same result. The orifice(s) 90 are sized such that when the flow exceeds a predetermined minimum flowrate, the float 70 overcomes gravitational forces or spring biasing forces and moves from a lower position to the fully open or upper position. As the magnet 80 moves to the fully open position, the magnet triggers the magnetically operated reed switch 30 as described further, below. When the metering ring is utilized, it should be placed upstream of the float orifice 90. The orifice (or combination of orifices) 90 are sized such to trigger the float to actuate from its lower position to the open/upper position when the flow exceeds a predetermined level. Alternatively, the flow sensor may be used to sense a reduction in flow by sizing the orifice 90 (or combination of orifices) such that the float 70 is normally in the upper position and lowers upon a reduction in flow to a predetermined level.

The float/magnet design must be vertically oriented because it is a gravity biased system. When a sensor orientation other than vertical is desired, a spring may be alternatively be placed within the guide assembly 140 for resistance with the float 70 such that the sensor assembly 10 may be oriented other than vertical.

The second component 22 of the modular housing 10 comprises an outer face 53 having a fluid outlet 100 which may further comprise a metal to metal fitting for connection to other assemblies. It is preferred that the outlet 100 comprise a VCR type seal 102 such as that described for the inlet seal 44, above. Connected to the fluid outlet 100 is an outlet passageway 56 which is joined on its innermost end by two or more conduits 120. An optional conduit 130 or pressure balancing port may also be utilized which is connected between the outlet passageway 56 and to the top of a guide assembly 140. These fluid conduits 120,130 are thus connected to the axial fluid passageway 50 when components 22,24 are assembled. The guide assembly 140 is affixed to the second component 22 and comprises a body having a cylindrical opening for guiding the float 70 from its lower (low flow) position to its upper fully open (high flow) position. Preferably, the guide assembly is integral with the second component 22 i.e., no welds or other connections are used. The diameter of the cylindrical opening of the guide 140 is only slightly larger than the outer diameter of the float 70. It is important the guide assembly 140 be co-axially and concentrically aligned with the float 70 in order for proper operation of the sensor.

The interior mating surfaces 150,152 of the second and third components 22,24, respectively, have a unique annular metal-to-metal alignment seal 154 which is an important feature of the invention. This seal provides for co-axial and concentric alignment of the float guide assembly 140 with the float 70, as well as with the main fluid passageway 50. Mating surfaces 150,152 further provide engagement surfaces which maintain the axial dimension of the sensor assembly 10 as well as maintaining the vertical clearance between the mating surfaces 168 and 176 in the region of the seal 154.

Figure 7:
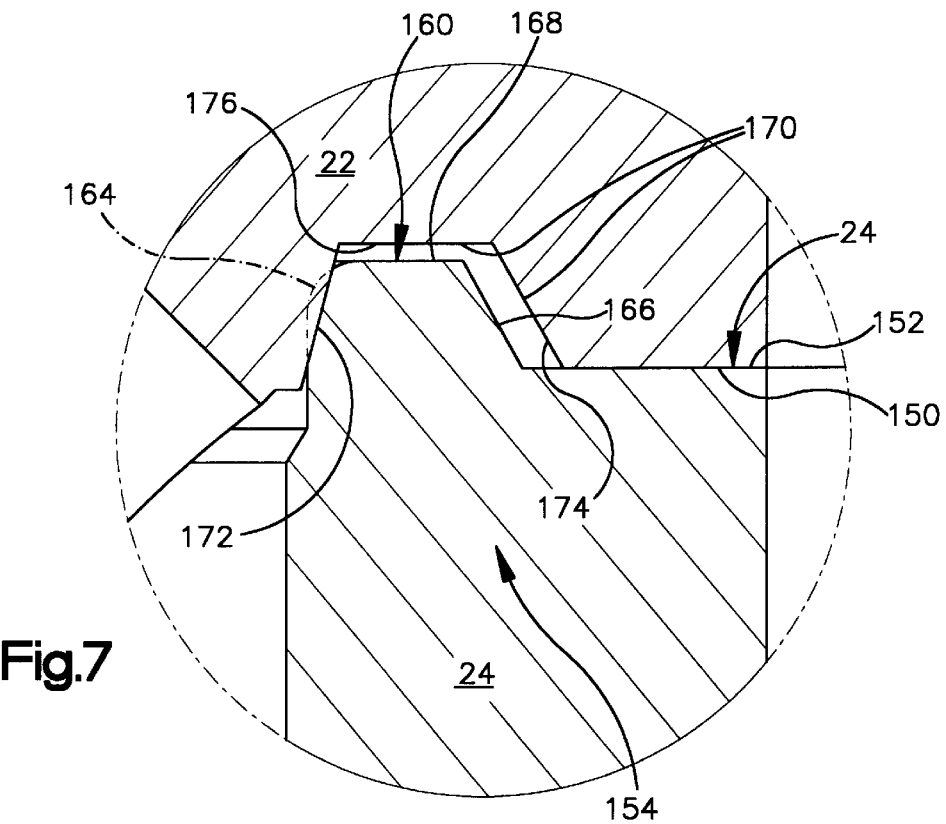
FIG. 7 shows a greatly enlarged view of the flow sensor seat of the invention as shown in FIG. 5.
Figure 8:
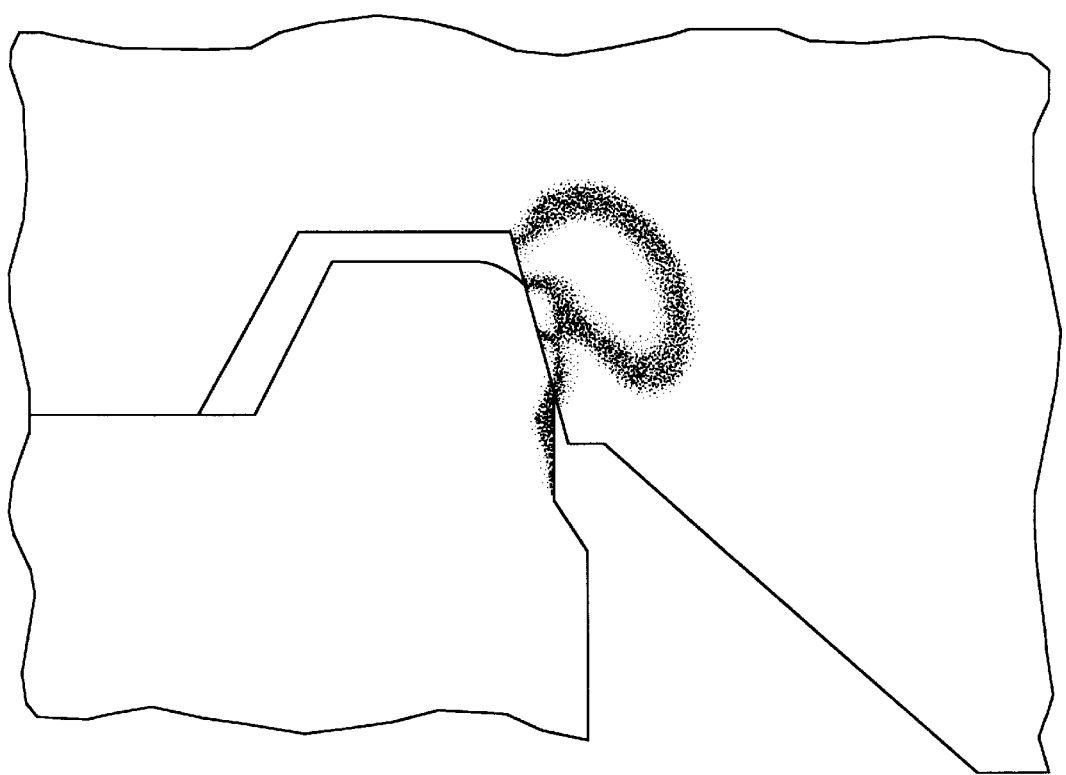
FIG. 8 shows a Finite Element Analysis simulation of the sensor seal under compressive stress.

In addition to the unique alignment feature, the seal 154 also provides a leaktight connection. FIG. 7 shows a greatly enlarged view of the metal to metal alignment seal 154.

Component 24 has a raised annular member 160 which has a radiused innermost edge 164 (when undeformed as shown in phantom in FIG. 7) and an angled annular surface 166 with a planar surface 168 there between. Component 22 further comprises an annular groove 170 having an angular or inclined wall 172 for engaging the radiused edge 164. The inner wall 172 is inclined in the range between zero and ninety degrees as measured from the vertical axis parallel to the axial passageway 50. The inner wall 172 preferably is inclined in the range of about 10 to 30 degrees. Most preferably, the inner wall 172 is inclined in the range of about 10 to 25 degrees. It is important that the vertical clearances (i.e., between surfaces 168 and 176) and horizontal clearances (i.e., between surfaces 174 and 166) be maintained in order to control the integrity of the seal 154. Thus, the shape or inclination of surfaces 166, 168, 174 and 176 may be any shape as long as a clearance is maintained in the vicinity of the seal such that only the radiused edge 164 and inclined wall 172 are in contact.

This unique seal design 154 allows a modular flow sensor 10 to be constructed without the use of any welds in the wetted passageway while still providing for concentric and co-axial alignment of the fluid passageways while providing a leak tight seal. The modular dual component design allows for easy cleaning and electro-polishing of the components to the highest industry standards while not introducing contaminants from the welding process into the sensor device.

In order to assemble the components 22 and 24, the guide assembly is first inserted into the axial passageway 50. A compressive force is then exerted upon the mating components 22,24 by a vise or other device in order to form the seal 154 such that the surfaces 150,152 are mated. The seal 154 is formed when the radiused edge 164 of the annular member 160 interferes with the angled annular surface 172 of the annular groove 170 such that the angled annular surface 172 bears against the radiused edge 164 causing a slight deformation of the radiused edge resulting in the formation of a leak tight seal 154, see FIG. 8. Edge 164 and surface 172 thus cooperate together to center the component 22 and its subparts with respect to component 24. In particular, the guide assembly is co-axially and concentrically aligned with respect to the axial passageway 50 and the float 70. Further, passageways 120 are aligned with the outlet 139 of component 24. After the leak tight seal is formed, the first, second and third components 20,22,24 may be positively connected together by any suitable means such as by fasteners or by weld in order to maintain the seal.

Figure 9:
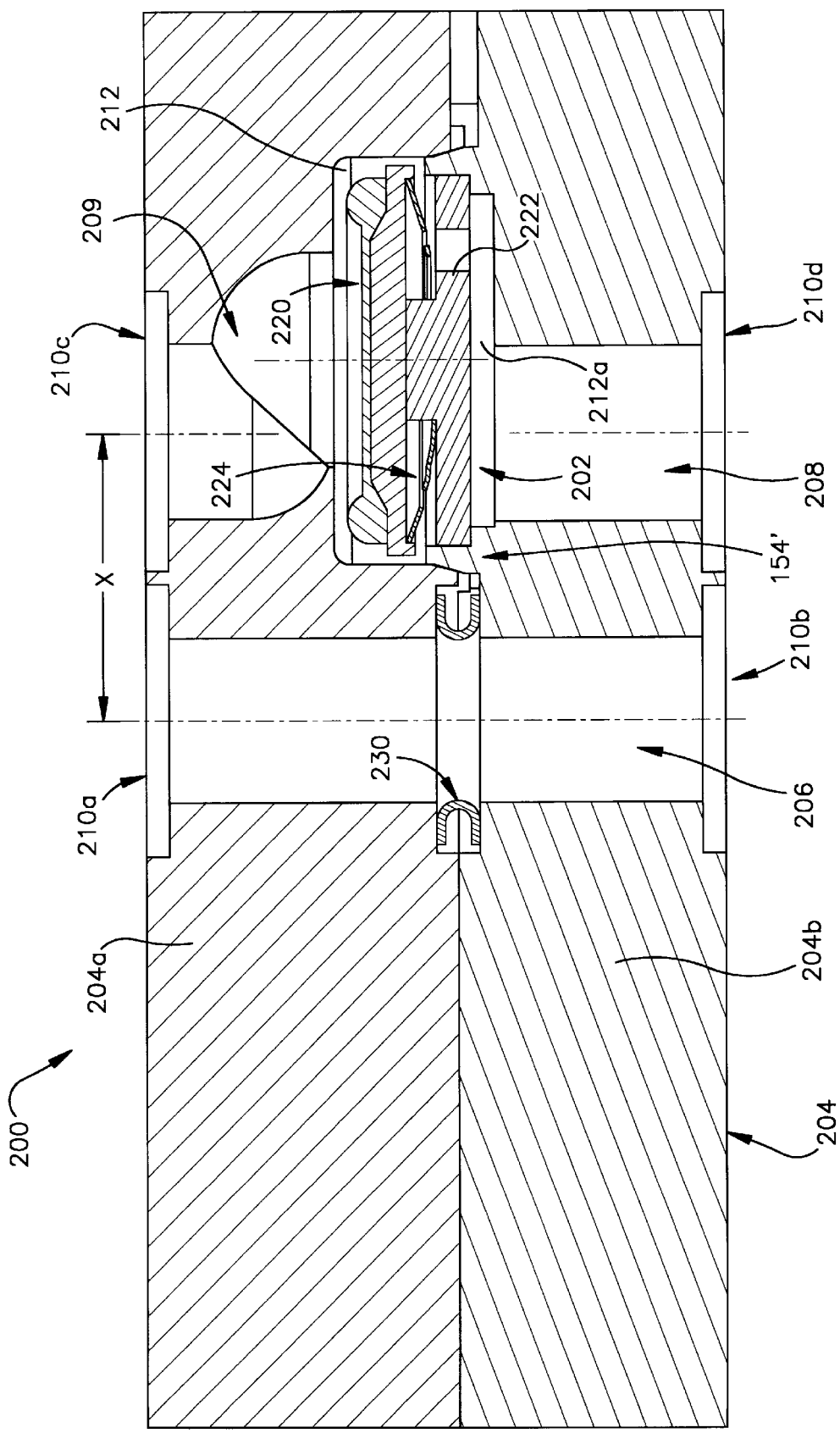
FIG. 9 illustrates in cross-section another embodiment of the invention used with a check valve.

As noted herein, the present invention can be used with other modular flow devices such as valves. FIG. 9 illustrates another embodiment of the invention used to realize a modular check valve arrangement. As in the other embodiments described herein, the assembly 200 permits a flow device, in this example a check valve 202, to be internally installed in a modular housing or substrate 204. The substrate 204 includes a number (in this example, two) of internal flow passages 206, 208 with appropriate ports 210a–d located on the substrate surfaces to permit fluid communication with additional modular substrates and/or surface mounted components (not shown). For clarity, FIGS. 9 and 10 omit the seal arrangements for the external ports 210a–d.

In general, the footprint of the substrates are determined by industry standards and hence dimensions such as the distance "X" between the centerlines of the ports are fixed. In order to accommodate a check valve 202, the fluid passage 209 which serves as the inlet to the check valve 202 includes an offset so as to open into the center region of a valve chamber 212. The outlet fluid passage 208 can be formed transverse the substrate 204 surface and it will be noted is off center with respect to the check valve 202 outlet 212a. In FIG. 9 the valve 202 is shown in the open position.

The check valve 202 is disposed in the valve chamber 212 and in this embodiment is a check valve as described in U.S. Pat. No. 4,856,555 the entire disclosure of which is fully incorporated herein by reference. In essence the check valve 202 includes a valve element 220, a stop member 222 and a guide member 224. Operation is substantially as described in the noted '555 patent above.

In order to provide a weldless seal for the check valve 202 within the substrate 204, a seal arrangement 154' such as shown and described as seal 154 in FIG. 7. The substrate 204 includes an upper section 204a and a lower section 204b with mating surfaces (as viewed in FIG. 9). The fluid passage 206 is sealed at the interface of the substrate sections 204a,b by any convenient seal arrangement, in this example a conventional C seal 230.

The body seal 154' as described herein thus permits a check valve to be positioned within a flow passage internal to the substrate housing 204 while maintaining the standard external dimensions and port configurations needed for the standard surface mount modular assembly 200. Additionally, as with the other embodiments described herein, the device 202 can be installed and sealed within the substrate 202 without welding.

Figure 10:
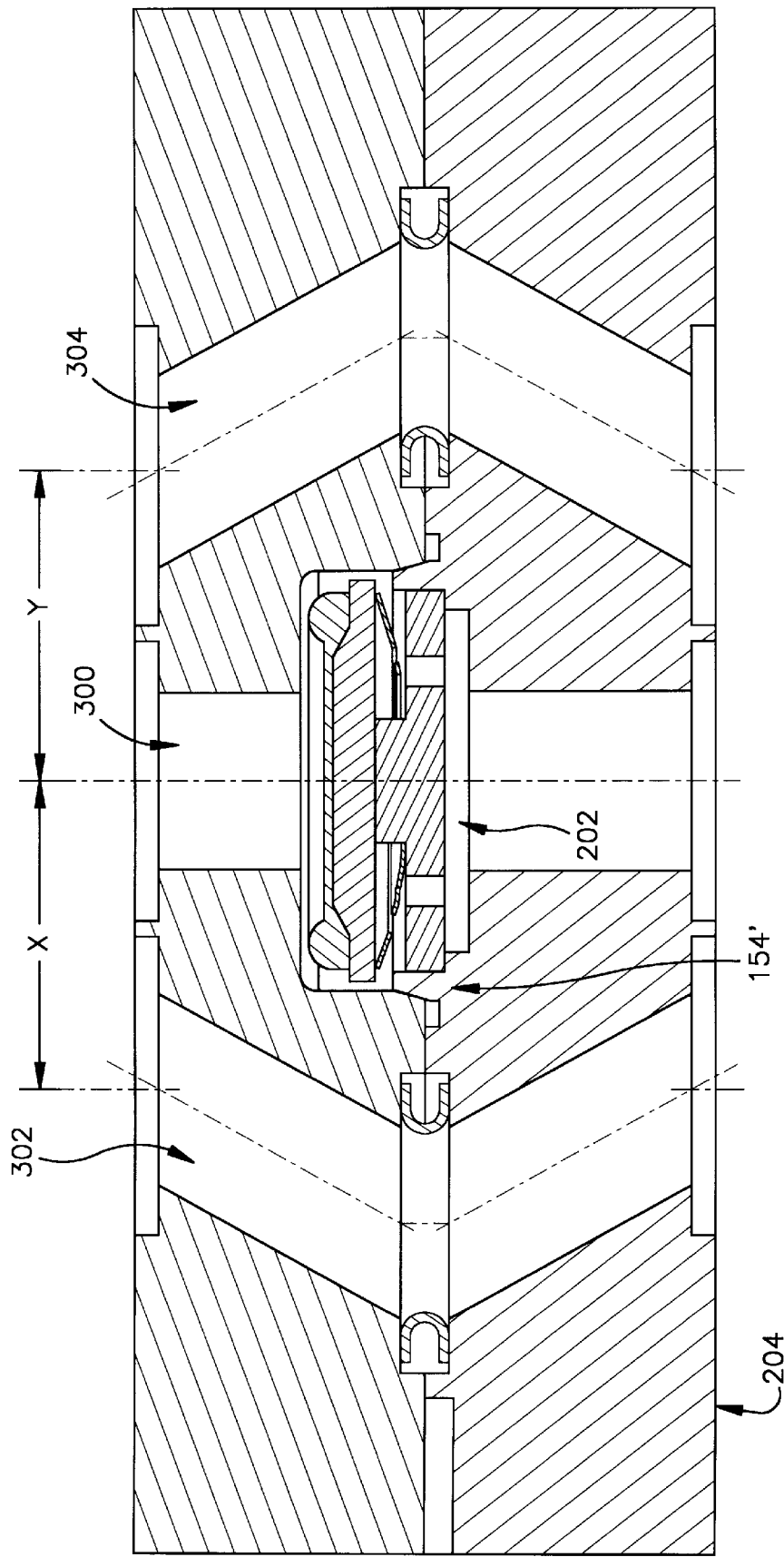
FIG. 10 illustrates in cross-section another embodiment of the invention used in a three way check valve configuration.

FIG. 10 illustrates still another embodiment of the invention. The configuration of FIG. 9 is for a two way check valve design in that the check valve checks flow between the fluid passages 206 and 208. The use of the seal 154' and the compact check valve 202 can also be used to realize a three way valve configuration as in FIG. 10. Thus, the check valve 202 is disposed within a first and central fluid passage 300 formed in the substrate 204 (again for clarity the port seals are omitted). In the embodiment of FIG. 10 the outer radial lip on the back of the valve element 220 has been omitted, with the guide member 224 simply adjoining the back surface of the valve element, the raised lip not being required for every application. Adjacent the central passage 300 are two through passages 302 and 304. These fluid passages are formed at an angle to accommodate the volume required for the check valve 202. However, the distances "X" and "Y" between the centerlines of the ports can be industry standard for surface mounted components on standard substrates. The distances X and Y may be but need not be the same. The check valve 154' thus can be used to control flow between the three passages 300, 302 and 304. Those skilled in the art will appreciate that more fluid passages (for example, a four way arrangement) could be included for applications wherein the substrate dimensions permit added fluid passages.

Figure 11:
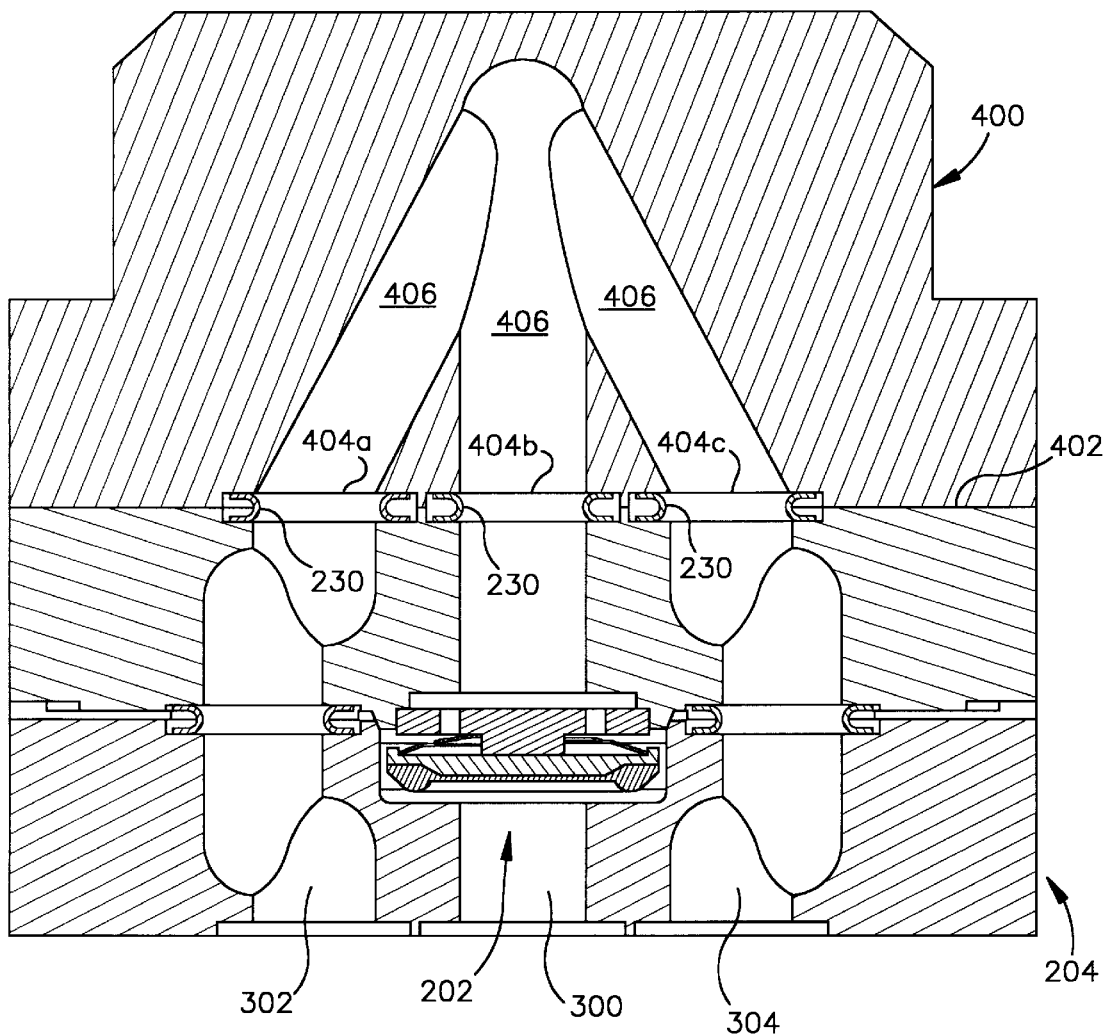
FIG. 11 illustrates another embodiment of the three way check valve of FIG. 10.

FIG. 11 illustrates an example of an arrangement of a three way check valve such as the check valve 202 illustrated in FIG. 10. An advantage of the check valve 202 is that it is sufficiently small to fit within a standard size substrate 204 with enough room left to form the fluid passages 302 and 304 around the check valve 202 while maintaining the standard X and Y dimensions. FIG. 11 illustrates one embodiment of a modular cap 400 that is appropriately sized to fit on one surface 402 of the substrate 204. The cap 400 can be mounted on the substrate 204 by any convenient device such as bolts for example (not shown). As in the embodiment of FIGS. 9 and 10, the substrate 204 includes two sections 204a and 204b that are joined together and do not include a welded interface.

The cap 400 has three ports 404a, 404b and 404c formed therein that align with corresponding ports in the substrate 204. A series of bores 406 connect the three ports 404a–c. Fluid tight seals such as, for example, conventional C-seals 230 are used to form a fluid tight interface between the cap 400 and the substrate 204. The check valve 202 thus can be used to check flow between the fluid passage 300 and passages 302 and 304. The cap 400 can thus be installed as a surface mounted component, just like a valve or flow meter or other MSM component.

With reference to FIGS. 12–14 another embodiment of a MSM check valve is illustrated. In this embodiment, a check valve 500 is disposed in an MSM body 501 to form a MSM surface mounted component in the form of a check valve component. The body 501 has a plurality of bolt holes 520 in the corners for mounting to an integrated gas system manifold or substrate such as for example in FIG. 2. A body cavity 502 is machined into the body 501 with an inlet port 503 and an outlet port 504 machined in the bottom of the cavity 502. A poppet or plunger 505 has a radial groove 506 facing the port 503 which houses an o-ring or other suitable seal 507. The seal 507 is appropriately sized to surround the inlet port 503 when the plunger 505 is in the down position (in FIGS. 12 and 13 the plunger is illustrated in the up or open valve position).

On the other side of the plunger 505 opposite the seal 507 there is a cylindrical protrusion 508 to provide a location mechanism for a spring 509. This spring 509 serves to bias the seal 507 housed in the plunger 505 against the bottom of the cavity 502. A cylindrical top 510 has a cylindrical recess 511 that has an offset concentricity to the circumference of the top 510 and the cavity 502. This recess provides a location for the spring 509 which in turn locates the plunger 505 and the seal 507 so that the seal circumference contacts the bottom of the cavity between the inlet port 503 and the outlet port 504. The body cavity 502 has a counter bore 522 to locate the top 510 which is welded into place.

It will be appreciated that the basic check valve 500 design is very similar to the check valve 202 of the previous embodiments herein. A notable distinction is that the plunger 505 and integral protrusion 508 form a single piece in place of the two piece arrangement of the valve element 220 and the stop member 222 of the earlier embodiment herein. A coil spring 509 is also used in place of a disk spring for the guide member 224. The seal 507 diameter is substantially larger, however, than the diameter of the valve element 220. This may in some applications improve the low pressure sensitivity of the check valve 500. The tradeoff is that the larger valve design prevents a side by side three port configuration such as shown in FIGS. 10 and 11 herein for standard substrate sizes. By "standard" substrate sizes is simply meant those substrate dimensions recognized in the industry for having compatible and interchangeable modular gas stick designs. FIG. 14 simply shows the various elements in an exploded view.

When the MSM check valve of FIGS. 12–14 is installed on a gas stick substrate, the inlet and outlet ports 503, 504 align with corresponding ports on the substrate.

Figure 15:
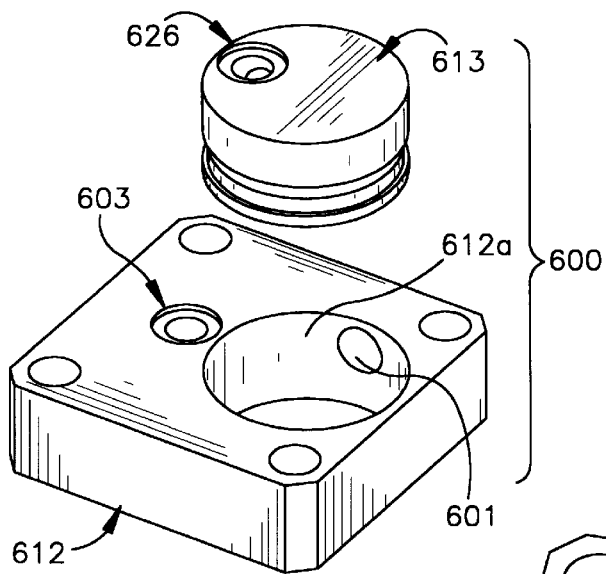
FIGS. 15–17 illustrate a further embodiment of a check valve for MSM applications.
Figure 16:
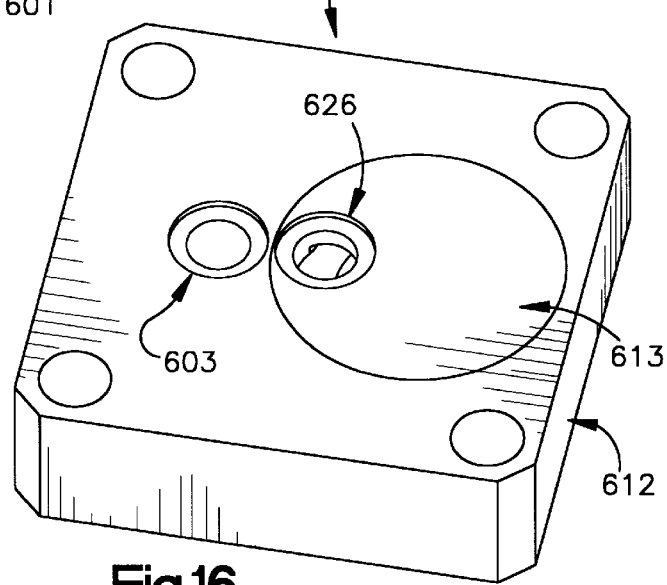
Figure 17:
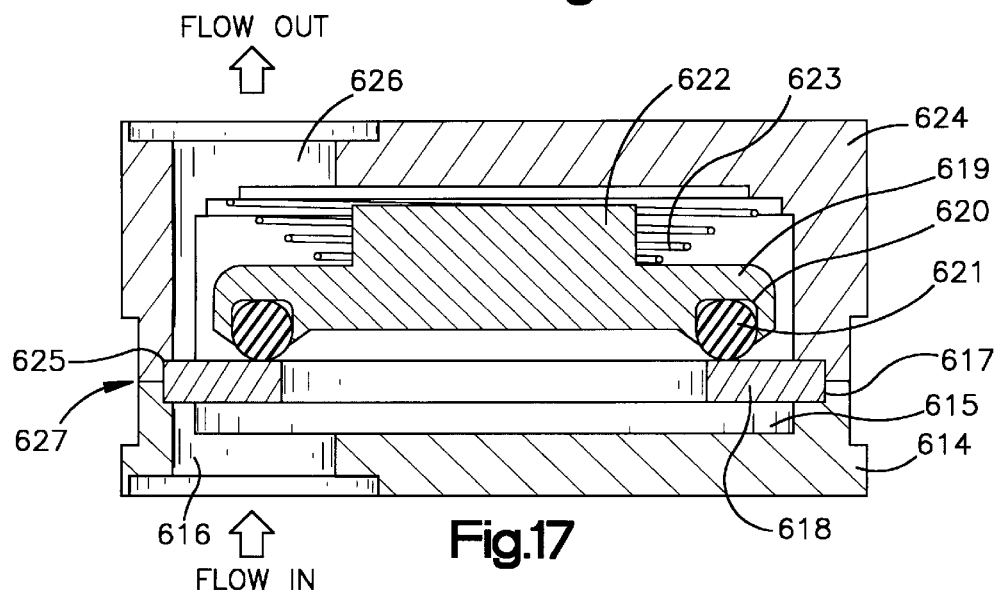

Another embodiment of the MSM check valve 600 is illustrated in FIGS. 15–17. FIG. 15 shows a valve locator housing 612 and the check valve assembly 613. FIG. 16 shows the check valve assembly 613 installed in the housing 612. In this embodiment the assembly 613 is a separate component that can be installed in a standard size substrate such as the locator housing 612. The locator housing may be a base substrate interconnected to other substrates, or could be a substrate that is surface mounted to or sandwiched between other substrates. The substrate 612 includes a standard port 603 that is spaced a standard distance X from the check valve port 626 when the check valve assembly 613 is installed in the substrate 612. In this manner a conventional surface mounted component or another substrate with standard port configurations (not shown) can be mounted to the substrate 612 for fluid communication with the ports 603, 626. Another substrate or surface mounted component could also be mounted on the other side of the substrate 612, thus sandwiching the substrate 612 between two other substrates, two surface mounted components or a substrate and a surface mounted component. As an alternative embodiment, portions of the check valve assembly 613 may be integrally formed in the substrate 612. The substrate 612 includes a cylindrical positioning bore 612a formed therein into which the check valve assembly 613 is disposed.

The check valve assembly 613 shown in FIGS. 15 and 17 includes an inlet plate 614 which has a recessed cavity 615 on the inside and an inlet port 616 on the other side which is located off center and communicates through the plate 614 to the internal cavity 615. The internal cavity has a counter bore 617 which provides a location for a sealing plate 618. A plunger 619 has a radial groove 620 which houses an o-ring or other suitable seal 621. The edges of the groove 620 may be rolled over to capture the seal. On the other side of the plunger 619 there is a cylindrical protrusion 622 to provide a location for a spring 623. A cylindrical outlet cup 624 which houses these valve parts has a recessed counter bore 625 to locate the outlet cup 624 to the sealing plate 618. The outlet cup 624 has an outlet port 626. The circumferential edges of the inlet plate 614 and the outlet cup 624 are aligned to each other by the sealing plate located in their respective counter bores 617, 625. The relative alignment of the inlet and outlet ports 616, 626 may be selected based on the port configuration of other modular blocks or components (not shown in FIGS. 15–17) mounted to the modular check valve assembly 600 body 612. These edges are welded together as at 627 where they surround the sealing plate fusing the inlet plate 614, the outlet cup 624, and the sealing plate 618 together forming a leak tight housing and sealing the leak path around the circumference of the sealing plate. The finished assembly 613 can then be installed in a substrate or other positioning body 612 as described above. As shown in FIG. 15, an access hole 601 is provided that can receive a set screw or other securing device to hold the assembly 613 in the body 612 to maintain alignment of the outlet port 626 and a surface port 603 in the positioning body 612. The welding operation may be omitted by provided a seal arrangement described herein with respect to FIGS. 3–10.

The check valve assembly 613 provides a flow through operation as compared to the lateral flow operation of the embodiment of FIG. 12.

Although the invention has been disclosed and described with respect to certain preferred embodiments, certain variations and modifications may occur to those skilled in the art upon reading this specification. For example, this invention could be applicable to other modular flow devices, such as, but not limited to, fluid metering devices, fluid restricting devices or valves. Any such variations and modifications are within the purview of the invention notwithstanding the defining limitations of the accompanying claims and equivalents thereof.

We claim:

1. In a modular flow device of the type having a first component and a second component wherein said first component has a first mating surface and said second component has a second mating surface and wherein each component mating surface has a respective axial flow passageway therethrough, a seal structure for joining and aligning said first mating surface and said second mating surface, the seal comprising:

a protruding annular radiused edge about said axial passageway of said first mating surface;

an annular groove about said axial passageway of said second mating surface, with said groove having an inner angled wall for engaging with said annular radiused edge when said mating surfaces are compressively joined whereby a leak proof seal is formed around said fluid passageways and said passageways are aligned with respect to each other; and a check valve disposed in one of said passageways.

2. The seal of claim 1 wherein said radiused edge dimensionally interferes with said groove when said mating surfaces are compressively joined.

3. The seal of claim 1 wherein said angled wall of said groove has an angle in the range between about zero to ninety degrees as measured from the axis of the flow passageway.

4. The seal of claim 1 wherein said angled wall of said groove has an angle in the range of about 10 to 30 degrees as measured from the axis of the flow passageway.

5. The seal of claim 1 wherein said angled wall of said groove has an angle in the range of about 10 to 25 degrees as measured from the axis of the flow passageway.

6. The seal of claim 1 wherein said mating surfaces provide engagement means for limiting axial compression of the surfaces.

7. The seal of claim 1 wherein a clearance is maintained about said seal between interior walls of said groove and the annular radiused edge wherein only said annular radiused edge and said angled wall of said groove are in engagement when said first and second mating surfaces are compressively engaged.

8. A modular flow device comprising:

a first component and a second component with each said component having an axial flow passageway therein; said first component having an inner sealing surface with a protruding annular surface about said axial flow passageway and having an inner radiused surface;

said second component having an inner sealing surface having an annular groove about said axial passageway with said groove having an angled wall;

said inner angled wall of said groove dimensionally interfering with said inner radiused surface of the annular surface when said first component and said second component are compressively engaged whereby a leak proof seal is formed around the passageways and the passageways are co-axially aligned with respect to each other; and a flow control device disposed in one of said passageways.

9. The modular flow device of claim 8 further comprising:

an upper face on said first component with a fluid outlet connected to said axial passageway and a lower face on said second component having a fluid inlet connected to said axial passageway with a metal to metal seal surrounding said inlet and said outlet.

10. The device of claim 8 further comprising a magnetically responsive switch mounted adjacent to said fluid passageway and being positioned in a recess under a third component whereby said switch is accessible for maintenance when said switch is installed.

11. The device of claim 8 wherein said first component and said second component have interior mating surfaces for maintaining axial dimension of device when said first and second component are compressively engaged.

12. The device of claim 8 wherein said angled wall of said groove has an angle in the range of between about zero to ninety degrees as measured from the axis of the flow passageway.

13. The device of claim 8 wherein said angled wall of said groove has an angle in the range 10 of between about ten to thirty degrees as measured from the axis of the flow passageway.

14. The device of claim 8 wherein said angled wall of said groove has an angle in the range of between about ten to twenty-five degrees as measured from the axis of the flow passageway.

15. The device of claim 8 wherein a clearance is maintained about said seal between interior walls of said groove of said second component and the annular surface of said second component wherein only said inner radiused surface of said annular surface and said slanted wall of said groove are in engagement when said first and second components are compressively engaged.

16. The device of claim 8 wherein a guide assembly for positioning within said axial passageway is integrally connected to said first component.

17. The device of claim 8 wherein said first component is joined with said second component without a welded connection therebetween.

18. The device of claim 8 wherein said axial passageway of said first component contains a float and said second component comprises an integral float guide assembly for insertion into said axial passageway of said first component about said float.

19. A modular flow device comprising:

a first component and a second component with each said component having an axial flow passageway therein; said first component having an inner sealing surface with a protruding annular surface about said axial flow passageway and having an inner radiused surface;

said second component having an inner sealing surface having an annular groove about said axial passageway with said groove having an angled wall;

said inner angled wall of said groove dimensionally interfering with said inner radiused surface of the annular surface when said first component and said second component are compressively engaged whereby a leak proof seal is formed around the passageways and the passageways are co-axially aligned with respect to each other; and a check valve disposed in one of said passageways.

* * * * *